(12) United States Patent
Pinder (10) Patent No.: US 9,485,095 B2
(45) Date of Patent: Nov. 1, 2016

(54) CLIENT CONTROL THROUGH CONTENT KEY FORMAT

(71) Applicant: Cisco Technology, Inc., San Jose, CA (US)

(72) Inventor: Howard G. Pinder, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 184 days.

(21) Appl. No.: 13/773,916

(22) Filed: Feb. 22, 2013

(65) Prior Publication Data

US 2014/0245009 A1    Aug. 28, 2014

(51) Int. Cl.
G06F 9/00 (2006.01)
H04L 9/08 (2006.01)
G06F 21/10 (2013.01)

(52) U.S. Cl.
CPC ............. *H04L 9/0866* (2013.01); *G06F 21/10* (2013.01)

(58) Field of Classification Search
None
See application file for complete search history.

(56) References Cited

U.S. PATENT DOCUMENTS

| | | | | |
|---|---|---|---|---|
| 5,592,554 A * | 1/1997 | Moehrmann | ......... | H04L 9/0891 380/256 |
| 6,819,766 B1 * | 11/2004 | Weidong | ................. | H04L 9/088 380/277 |
| 7,065,642 B2 * | 6/2006 | Sandhu | ................... | H04L 9/321 380/279 |
| 7,240,218 B2 * | 7/2007 | Kean | ........................... | 713/193 |
| 7,327,216 B2 * | 2/2008 | Ghabra | ............. | G07C 9/00309 235/382.5 |
| 7,757,086 B2 * | 7/2010 | Walmsley | ............ | B41J 2/17546 380/259 |
| 8,059,818 B2 * | 11/2011 | Asokan | ................. | H04L 63/062 380/277 |
| 8,498,418 B2 * | 7/2013 | Meissner | .............. | G06F 21/602 380/277 |
| 8,627,422 B2 * | 1/2014 | Hawkes | ................ | H04L 63/166 380/255 |
| 8,631,247 B2 * | 1/2014 | O'Loughlin | ............ | G06F 21/57 713/187 |

(Continued)

FOREIGN PATENT DOCUMENTS

EP      1816578 A2     8/2007
WO   2011109780 A2   9/2011

OTHER PUBLICATIONS

Jinna, S. Kurshid; Dr. Ganesan, L. Analysis of Reversible Image Watermarking using Bit Plane Coding and Lifting Wavelet Transform with Attacks. IEEE International Conference on Communication Control and Computing Technologies. Pub. Date: 2010. Relevant pp. 628-636. http://ieeexplore.ieee.org/stamp/stamp.jsp?tp=&arnumber=5670763.*

(Continued)

*Primary Examiner* — Jeremiah Avery
(74) *Attorney, Agent, or Firm* — Merchant & Gould P.C.

(57) ABSTRACT

Client control may be provided. First, content may be encrypted using an actual key. Then an identifier corresponding to a client device may be received and a transformation may be performed on the actual key and the identifier to produce a transmitted key. The transmitted key and the encrypted content may then be sent to the client device where it may be received. The client device may then receive the identifier corresponding to the client device and perform a reverse transformation on the transmitted key using the identifier to produce the actual key. The content may then be decrypted with the actual key.

15 Claims, 6 Drawing Sheets

(56) References Cited

U.S. PATENT DOCUMENTS

| | | | |
|---|---|---|---|
| 2003/0026431 A1* | 2/2003 | Hammersmith | H04L 9/0822 380/277 |
| 2004/0001595 A1* | 1/2004 | Hopkins | H04L 9/088 380/277 |
| 2004/0109568 A1* | 6/2004 | Slick | G06F 21/608 380/277 |
| 2007/0174638 A1* | 7/2007 | Fan | G06F 21/16 713/193 |
| 2008/0086641 A1* | 4/2008 | Rodgers | H04L 9/0891 713/176 |
| 2009/0059943 A1* | 3/2009 | Nonomura | G06F 13/4045 370/419 |
| 2010/0208894 A1* | 8/2010 | True et al. | 380/270 |
| 2010/0254536 A1 | 10/2010 | Dellow | |
| 2010/0299517 A1* | 11/2010 | Jukic | H04L 63/0823 713/150 |
| 2011/0010720 A1* | 1/2011 | Smith | G06F 21/00 718/102 |
| 2011/0296440 A1* | 12/2011 | Laurich | G06F 21/602 719/326 |
| 2012/0321080 A1 | 12/2012 | Candelore et al. | |
| 2014/0006797 A1* | 1/2014 | Cordella et al. | 713/189 |
| 2014/0226813 A1* | 8/2014 | Heffner | H04L 9/0819 380/44 |

OTHER PUBLICATIONS

Chiu, Dickson K.W.; Hung, Patrick C.K.; Cheng, Vivying S.Y.; Kafeza, Eleanna. Protecting the Exchange of Medical Images in Healthcare Process Integration with Web Services. HICSS 2007. Pub. Date: 2007. http://ieeexplore.ieee.org/stamp/stamp.jsp?tp=&arnumber=4076632.*

Kalker, Ton; Epema, Dick H.J.; Hartel, Pieter H.; Lagendijk, R. L., Van Steen, Maarten. Music2Share—Copyright-Compliant Music Sharing in P2P Systems. Proceedings of the IEEE. vol. 92, Issue: 6. Pub. Date: 2004. http://ieeexplore.ieee.org/stamp/stamp.jsp?tp=&arnumber=1299170.*

Federal Register 74618—vol. 79, No. 241. Pub. Date: Dec. 16, 2014. http://www.gpo.gov/fdsys/pkg/FR-2014-12-16/pdf/2014-29414.pdf.*

Kanjanarin, Wachiwan; Amornraksa, Thumrongrat. Scrambling and Key Distribution Scheme for Digital Television. Proceedings, Ninth IEEE International Conference on Networks, 2001. http://ieeexplore.ieee.org/stamp/stamp.jsp?tp=&arnumber=962331.*

Yang, Xiao-wen; Zheng, Zhi-hang. Key Distribution System for Digital Video Signal. 3rd International Conference on Signal Processing. vol. 2. Pub. Date: 1996. http://ieeexplore.ieee.org/stamp/stamp.jsp?tp=&arnumber=566218.*

International Search Report mailed May 8, 2014 cited in Application No. PCT/US2014/017148, 11 pgs.

* cited by examiner

CLIENT CONTROL THROUGH CONTENT KEY FORMAT

BACKGROUND

Digital rights management (DRM) is a class of access control technologies that are used by hardware manufacturers, publishers, copyright holders, and individuals to limit the use of digital content and devices. DRM may inhibit uses of digital content that are not intended by a content provider. Conditional access systems (CAS) are also a class of access control technologies that are used by content owners, service providers, and hardware manufacturers to limit the use of digital content and devices. Both DRM and CAS employ content encryption techniques, and methods to deliver the corresponding content encryption keys to valid receiver devices. The delivery of content encryption keys may involve the use of further protection techniques, and these techniques are assumed to be present any time a content encryption key is sent to a client device.

BRIEF DESCRIPTION OF THE DRAWINGS

The accompanying drawings, which are incorporated in and constitute a part of this disclosure, illustrate various embodiments of the present disclosure. In the drawings.

DETAILED DESCRIPTION

Overview

Client control may be provided. First, content may be encrypted using an actual key. Then an identifier corresponding to a client device may be received and a transformation may be performed on the actual key and the identifier to produce a transmitted key. The transmitted key and the encrypted content may then be sent to the client device where it may be received. The process of sending the transmitted key, as defined, for example, by the CAS or DRM, may involve further encryption and decryption transformation processes for protection from, for example, eavesdroppers and other attackers. The client device may then receive the identifier corresponding to the client device and perform a reverse transformation on the transmitted key using the identifier to produce the actual key. The content may then be decrypted with the actual key.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Whether a particular device or person has rights to use certain content may be managed by a Conditional Access System (CAS) or digital rights management (DRM) system. While conventional CASs and DRMs may deliver content keys to unscramble content and usage rights information, these are delivered in separate fields within messages. Embodiments of the disclosure, however, may deliver usage rights information as part of the content key. Enforcement of the usage rights may be performed, for example, by a system-on-chip (SOC) device that may use the content key to descramble the content. For example, the content key may be bound to a particular SOC.

Consistent with embodiments of the disclosure, functionality may be included in a SOC (or a hardened software implementation.) This functionality may be associated with the SOC's key storage register and descrambling block, and may be used in order to provide usage rights delivered within content keys. Because the usage rights may be self-contained within content keys, embodiments of the disclosure may be deployed on top of existing CAS and DRM systems. These systems can continue their role of delivering content keys, and embodiments of the disclosure may then operate on the delivered content keys.

By putting some basic tools within a SOC or within hardened software, an enterprise that creates content keys (and gives them to a DRM system for delivery to a client device) may have some amount of control over which client device those content keys will work with, and for how long. This may be done without requiring any modifications to existing DRMs and may work along with existing DRMs.

Consistent with embodiments of the disclosure, instead of providing clear content keys to the DRM, transformed content keys may be used. The transformation used to make the transformed content keys may be simple or complex, and may have the effect of limiting damage should the DRM leak or otherwise lose the content keys. Also, by binding the content key to a particular SOC, the DRM may be prevented from distributing them to unintended clients.

Figure 1:
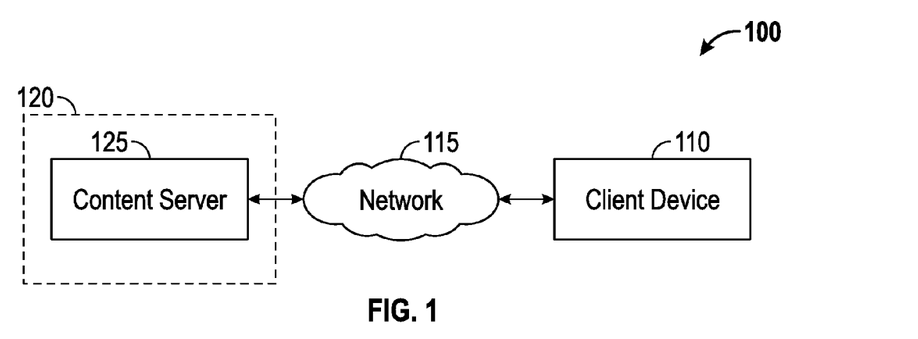
FIG. 1 is a block diagram of an operating environment including a client device.

FIG. 1 is a block diagram of an operating environment 100. As shown in FIG. 1, environment 100 may include a client device 110, a network 115, and a content delivery system (CDS) 120. CDS 120 may comprise a content server 125 capable of providing content to client device 110 over network 115. Content, for example, may comprise digital programs such as videos, television programs, movies, video on demand, unicast, and multicast broadcasts. The aforementioned are examples and the content may comprise other digital content forms.

The content may be communicated over network 115. Network 115 may be compatible with various communication protocols used to communicate the content. For example, content server 125 may communicate with client device 110 over network 115 using a datagram protocol (UDP) or other protocol typically used to communicate multicast transmissions over IP or non-IP networks such as QAM based content delivery. For various other transmissions, such as unicast transmissions, content server 125 may communicate with client device 110 over network 115 using Transmission Control Protocol/Internet Protocol (TCP/IP).

Consistent with embodiments of the disclosure, client device 110 may be configured to request, receive, buffer, playback, and store, for example, content, which may be embodied in IP video packets or other data packets received either directly or indirectly from CDS 120. Client device 125 may be, but is not limited to, a Wi-Fi access point, a cellular base station, a switch servicing multiple clients in a vicinity, a tablet device, a mobile device, a mobile phone, a smart phone, a telephone, a remote control device, a set-top box, a digital video recorder, a cable modem, a personal computer, a network computer, a mainframe, a router, other similar microcomputer-based devices, or any other computing device capable of communicating with CDS 120 over network 115.

Figure 2:
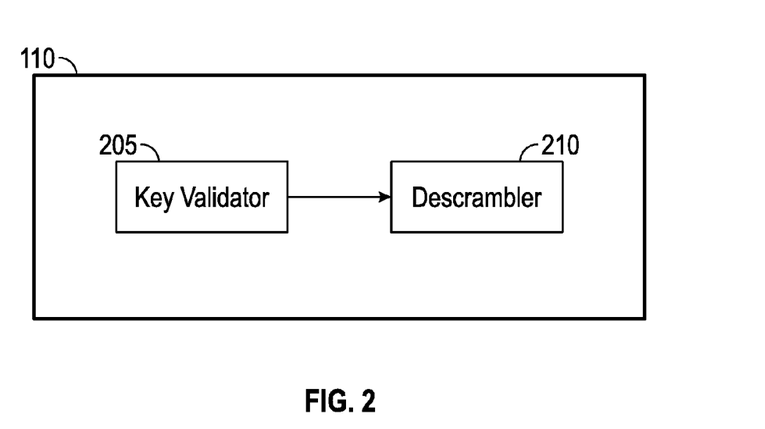
FIG. 2 is a block diagram of a client device.

FIG. 2 shows client device 110 in more detail. As shown in FIG. 2, client device 110 may include a key validator 205 and a descrambler 210. Key validator 205 and/or descrambler 210 may be practiced in one or more electrical circuits comprising discrete electronic elements, packaged or integrated electronic chips containing logic gates, a circuit utilizing a microprocessor, or on a single chip (e.g. a system-on-chip (SOC)) containing electronic elements or microprocessors. Furthermore, key validator 205 and/or descrambler 210 may be practiced in software as described in more detail below with respect to FIG. 8.

Figure 3:
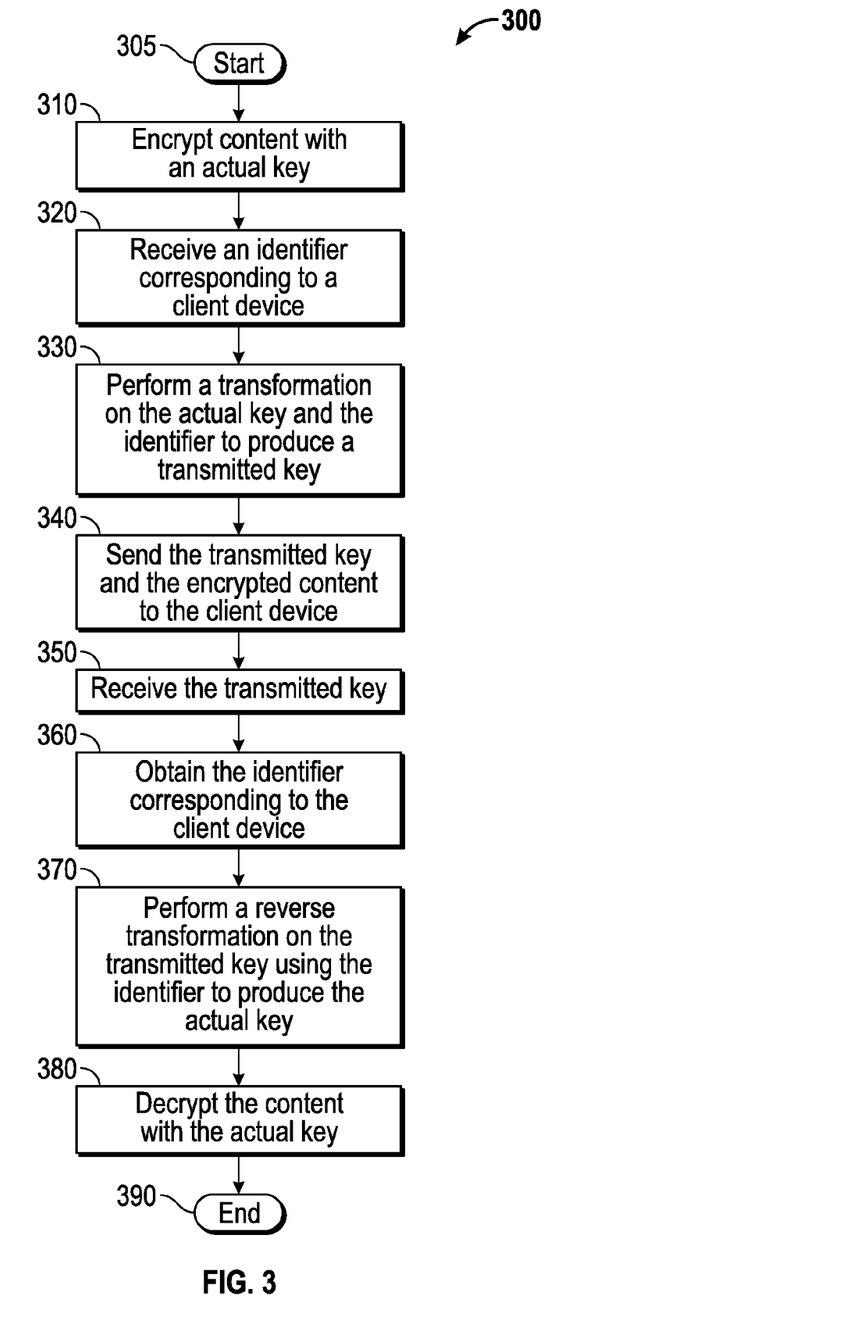
FIG. 3 is a flow chart of a method for providing client control.

FIG. 3 is a flow chart setting forth the general stages involved in a method 300 consistent with an embodiment of the disclosure for providing client control. Method 300 may be implemented using client device 110 as described in more detail above with respect to FIGS. 1 and 2 and in more detail below with respect to FIGS. 4 through 8. Ways to implement the stages of method 300 will be described in greater detail below.

Method 300 may begin at starting block 305 and proceed to stage 310 where content server 125 may encrypt content with an actual key. For example, an enterprise in control of the content key generation process may generate the actual key and encrypt the content using the actual key. However, the actual key may not be totally random. Rather the actual key may be created such that it may interoperate correctly. In the context of a 128 bit key, (as will be discussed in greater detail below with respect to FIG. 4) the effective key entropy has gone down, say for instance by 16 bits. So an advanced encryption standard (AES) key (e.g. the actual key), instead of having 128 bits of entropy, would have 112 bits, which may still be more than adequate for content scrambling purposes.

From stage 310, where content server 125 encrypts the content with the actual key, method 300 may advance to stage 320 where content server 125 may receive an identifier corresponding to client device 110. For example, a DRM system (e.g. within CDS 120) may want to deliver the actual key that was generated and used to encrypt the content to a specific client (e.g. client device 110.) The DRM may provide content server 125 with a SOC ID (e.g. the identifier) of client device 110, which may correspond to a consumer of the content who has usage rights to the content. The SOC ID is an example of one type of identifier and other types of identifiers may be used.

Once content server 125 receives the identifier (e.g. the SOC ID of client device 110) corresponding to client device 110 in stage 320, method 300 may continue to stage 330 where content server 125 may perform a transformation on the actual key and the identifier to produce a transmitted key.

For example, embodiments of the disclosure may create a value for the transmitted key that, once the transformation is reversed in stage 370, may produce the actual content key. In other words the transformation may be reversible or at least partially reversible in order to be able to create a value for the transmitted key that may be reverse transformed back into the actual key value for a given identifier (e.g. SOC ID.)

Figure 4:
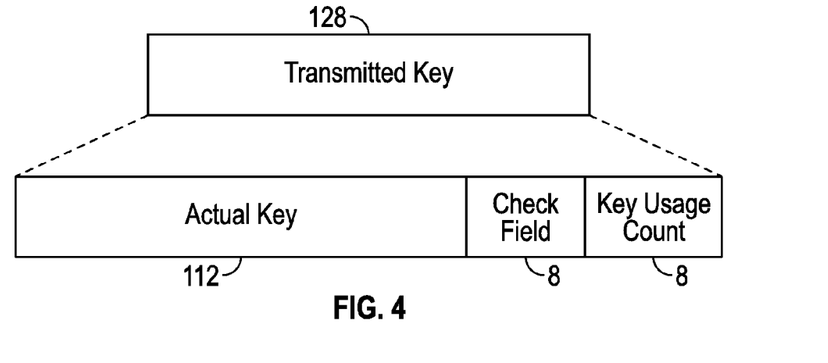
FIG. 4 illustrates a transmitted key.

FIG. 4 shows an example format of the transmitted key. The transmitted key of FIG. 4 is one example and other formats may be used. As shown in FIG. 4, a 112-bit key may be chosen and put into the actual key field. Then, a key usage count value may be chosen based on the desired key lifetime. (The usage count is described in greater detail below.) A check field may be calculated and included such that the result of a byte-wise XOR (e.g. reverse transformation in stage 370) of the entire transmitted key field with the identifier (e.g. SOC ID) equals zero. Byte-wise XOR is one type of operation and other operations such as byte-wise cyclic redundancy code (CRC) may be used.

After content server 125 performs the transformation in stage 330, method 300 may proceed to stage 340 where content server 125 may send the transmitted key and the encrypted content to client device 110. For example, the value for the transmitted key may be given back to the DRM that may then send the transmitted key to client device 110.

From stage 340, where content server 125 sends the transmitted key and the encrypted content, method 300 may advance to stage 350 where client device 110 may receive the transmitted key. For example, client device 110 may receive the transmitted key from the DRM. The encrypted content may be received directly from content server 125.

Once client device 110 receives the transmitted key in stage 350, method 300 may continue to stage 360 where client device 110 may obtain the identifier corresponding to client device 110. For example, when the identifier comprises the SOC ID of the SOC that includes key validator 205, client device 110 may look up the SOC ID from a one-time programmable (OTP) read only memory (ROM) in the SOC.

Figure 5:
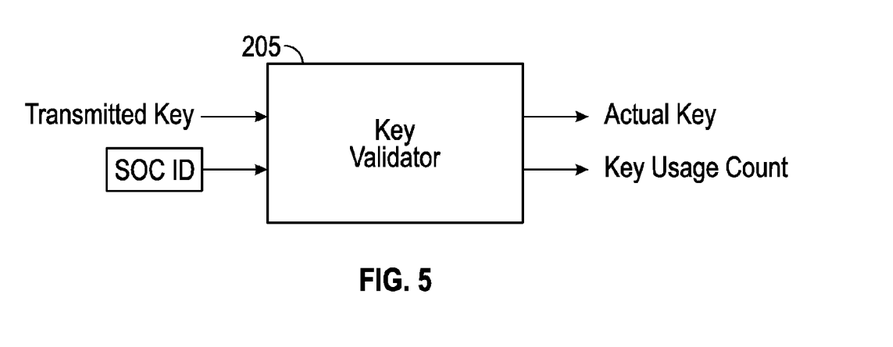
FIG. 5 is a block diagram of a key validator.

After client device 110 obtains the identifier in stage 360, method 300 may proceed to stage 370 where client device 110 may perform a reverse transformation on the transmitted key using the identifier to produce the actual key. For example, as shown in FIG. 5, at client device 110, when the DRM delivers the transmitted key to the SOC, the transmitted key may be an input to key validator 205, along with the SOC ID (i.e. the identifier) stored in OTP. Key validator 205 may then perform the reverse transformation to produce the actual content key that may be used to descramble the content.

Consistent with embodiments of the disclosure, however, if the same transmitted key were delivered to a different client (i.e. not client device 110), the reverse transformation would fail to produce the actual content key at least because the different client would have a different identifier (e.g. different SOC ID). This different identifier was not used to generate the transmitted key therefore it may not produce the corresponding actual key in the reverse transformation.

Figure 6:
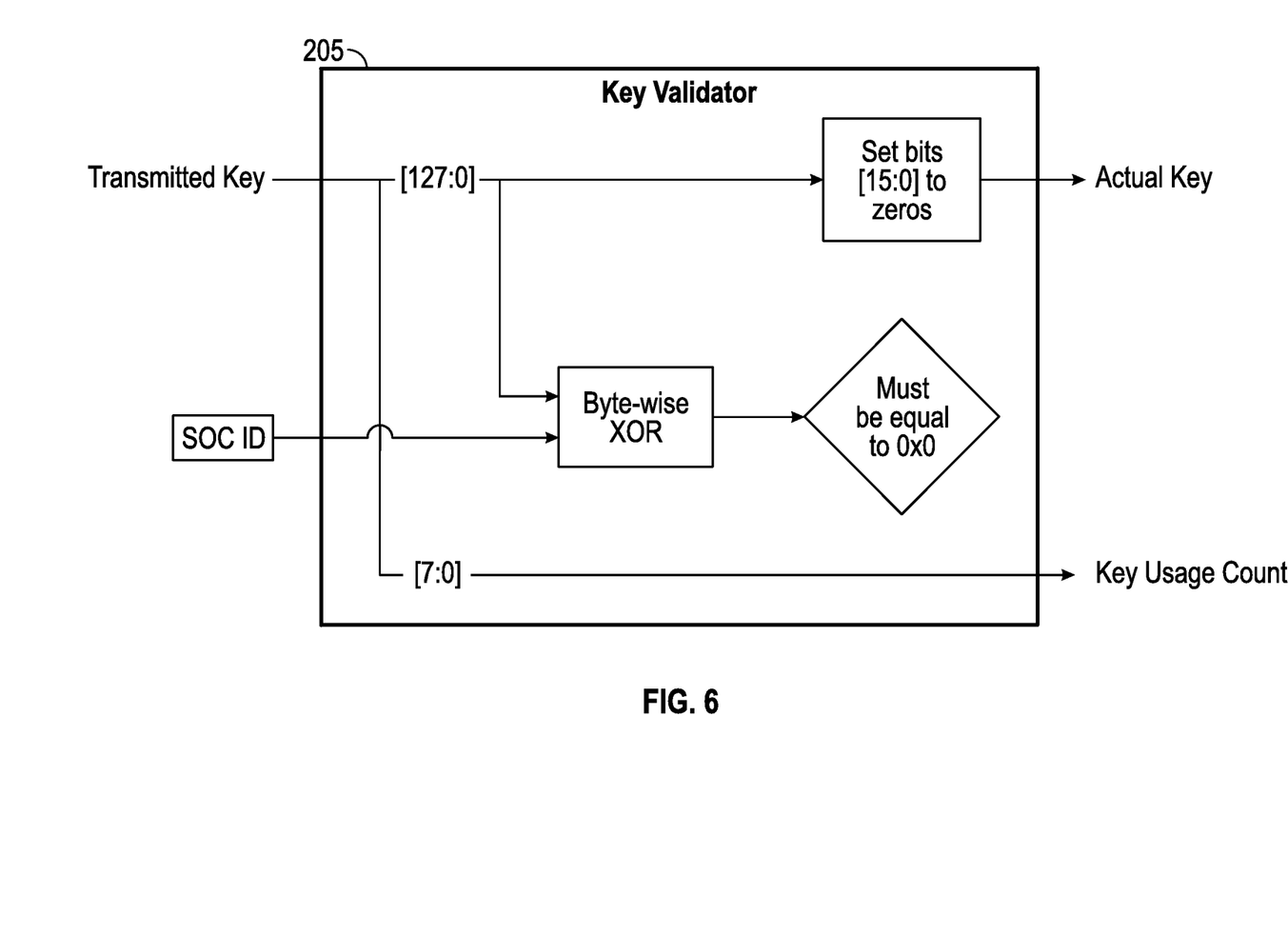
FIG. 6 is a block diagram of a key validator.

FIG. 6 shows an example of the reverse transformation. As shown in FIG. 6, to validate that the actual key is being delivered to the correct device (e.g. client device 110), the transmitted key and SOC ID may be put through the XOR function. If the result is not 0x00, then the transmitted key may not be valid. Other functions such as a CRC could be used instead of the XOR. If the transmitted key is valid, then the lower 16 bits may be cleared in order to produce the actual key. Also, the lowest 8 bits may become the key usage count value as will be described in greater detail below.

Figure 7:
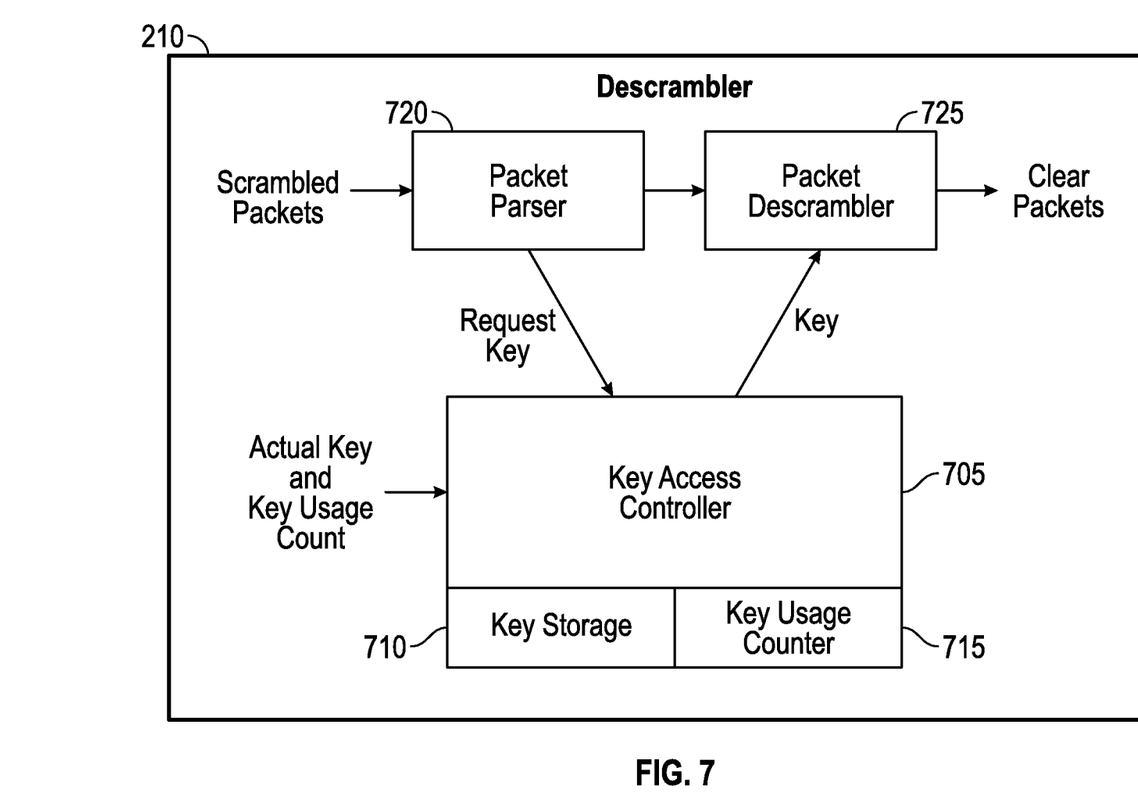
FIG. 7 is a block diagram of a descrambler.

From stage 370, where client device 110 performs the reverse transformation, method 300 may advance to stage 380 where client device 110 may decrypt (e.g. descramble) the content with the actual key. FIG. 7 shows descrambler 210 in greater detail. For example, the actual key and key usage count may arrive at descrambler 210 from key validator 205. The actual key may be stored in a key storage memory 710 within a key access controller 705. Also, the key usage count value may be loaded into a key usage counter 715.

Each time a packet arrives that requires descrambling (e.g. decrypting), a packet parser 720 may examine the packet, determine it needs descrambling, and request the appropriate key (e.g. the actual key) from key access controller 705. Key access controller 705 may first determine if the key usage count corresponding to the actual key is zero; and if so, the request for the actual key may be denied. If the key usage counter is not zero, key access controller 705 may then decrement the key usage counter, retrieve the actual key from key storage 715, and return it to a packet descrambler 725 that may produce clear packets with the actual key. The key usage counter may be decremented by key access controller 705 for each block of data (e.g. packet) decrypted with the actual key, and when the key usage counter reaches zero, key access controller 705 may erase the actual key from key storage 715. Once client device 110 decrypts content with the actual key in stage 380, method 300 may then end at stage 390.

Figure 8:
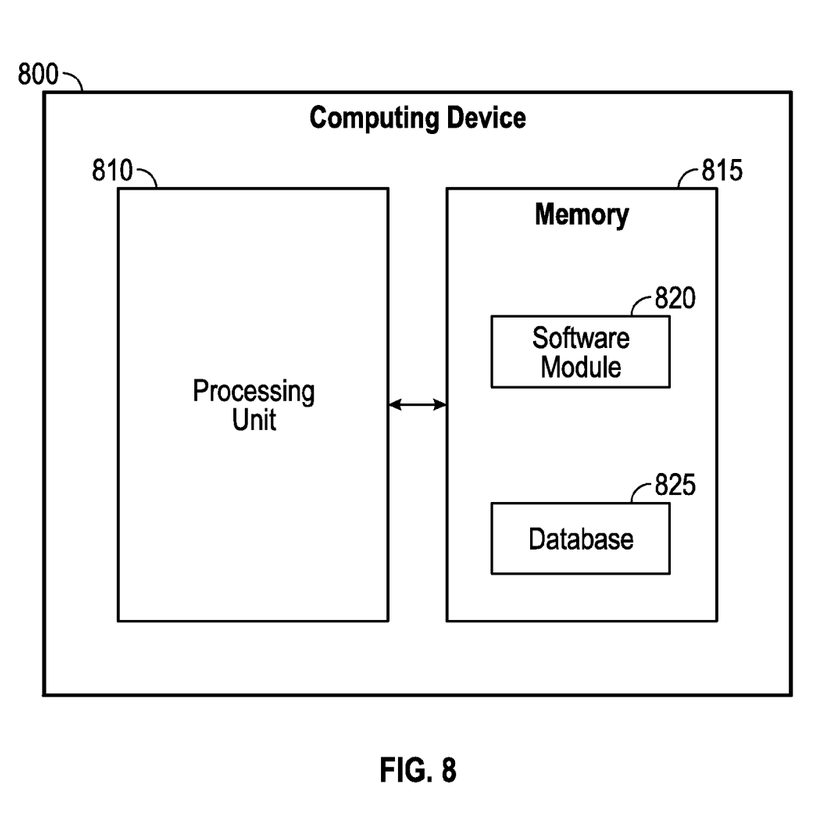
FIG. 8 is a block diagram of a computing device.

FIG. 8 shows a computing device 800. As shown in FIG. 8, computing device 800 may include a processing unit 810 and a memory unit 815. Memory unit 815 may include a software module 820 and a database 825. While executing on processing unit 810, software module 820 may perform processes for providing client control, including for example, any one or more of the stages from method 300 described above with respect to FIG. 3. Computing device 800, for example, may provide an operating environment for client device 110 or content server 125. Client device 110 and content server 125 may operate in other environments and are not limited to computing device 800.

Computing device 800 ("the processor") may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, or other similar microcomputer-based device. The processor may comprise any computer operating environment, such as hand-held devices, multiprocessor systems, microprocessor-based or programmable sender electronic devices, minicomputers, mainframe computers, and the like. The processor may also be practiced in distributed computing environments where tasks are performed by remote processing devices. Furthermore, the processor may comprise, for example, a mobile terminal, such as a smart phone, a cellular telephone, a cellular telephone utilizing Wireless Application Protocol (WAP) or unlicensed mobile access (UMA), personal digital assistant (PDA), intelligent pager, portable computer, a hand held computer, a conventional telephone, or a Wireless Fidelity (Wi-Fi) access point. The aforementioned systems and devices are examples and the processor may comprise other systems or devices.

An embodiment consistent with the disclosure may comprise a system for providing client control. The system may comprise a memory storage and a processing unit coupled to the memory storage. The processing unit may be operative to encrypt content with an actual key and receive an identifier corresponding to a client device. The processing unit may be further operative to perform a transformation on the actual key and the identifier to produce a transmitted key and to send the transmitted key and the encrypted content to the client device.

Another embodiment consistent with the disclosure may comprise a system for providing client control. The system may comprise a memory storage and a processing unit coupled to the memory storage. The processing unit may be operative to receive a transmitted key and to receive an identifier corresponding to a client device. The processing unit may be further operative to perform a reverse transformation on the transmitted key using the identifier to produce an actual key and to decrypt content with the actual key.

Yet another embodiment consistent with the disclosure may comprise a system for providing client control. The system may comprise a memory storage and a processing unit coupled to the memory storage. The processing unit may be operative to receive an identifier corresponding to a client device and to perform a transformation on an actual key used to encrypt content and the identifier to produce a transmitted key. The processing unit may be further operative to send the transmitted key and the encrypted content to the client device.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
    a key validator configured to:
        receive a transmitted key of a predetermined number of bytes, the transmitted key comprising an actual key in a first portion of the predetermined number of bytes, a usage count, and a check field in a second portion of the predetermined number of bytes,
        receive an identifier corresponding to a client device, the identifier comprising a system-on-chip identifier corresponding to the client device from a non-volatile memory within the client device, and
        perform a reverse transformation on the transmitted key using the identifier, wherein the key validator being configured to perform the reverse transformation comprises the key validator configured to:
            verify the check field of the received transmitted key using the identifier to produce the actual key,
            clear, upon verifying the check field, the second portion of the predetermined number of bytes from in the transmitted key, and
            initiate, in the cleared second portion, a key usage counter for the usage count; and
    a descrambler configured to:
        receive the actual key from the key validator, and
        decrypt content with the actual key, wherein the descrambler being configured to decrypt content comprises the descrambler being configured to;
            set the key usage counter with the usage count produced by the reverse transformation,
            decrement the key usage counter each time a packet of the content is decrypted, and
            stop the content decryption when the key usage counter is zero.

2. The apparatus of claim 1, wherein the reverse transformation also produces the usage count indicating a number of packets on which the actual key may be used to decrypt.

3. The apparatus of claim 1, wherein the reverse transformation comprises a byte-wise XOR.

4. The apparatus of claim 1, wherein the reverse transformation comprises a byte-wise XOR, the transmitted key including a check field value such that when the byte-wise XOR is performed on the transmitted key and identifier, zero is produced.

5. The apparatus of claim 1, wherein the reverse transformation comprises a byte-wise cyclic redundancy code (CRC).

6. An apparatus comprising:
    a descrambler configured to:
        receive an actual key from a key validator, and
        decrypt content with the actual key, wherein the descrambler being configured to decrypt content comprises the descrambler being configured to;
            set a key usage counter with a usage count produced by a reverse transformation,
            decrement the key usage counter each time a packet of the content is decrypted, and
            stop the content decryption when the key usage counter is zero.

7. The apparatus of claim 6, wherein the reverse transformation also produces the usage count indicating a number of packets on which the actual key may be used to decrypt.

8. The apparatus of claim 6, wherein the reverse transformation comprises a byte-wise XOR.

9. The apparatus of claim 6, wherein the reverse transformation comprises a byte-wise XOR, the transmitted key including a check field value such that when the byte-wise XOR is performed on the transmitted key and identifier, zero is produced.

10. The apparatus of claim 6, wherein the reverse transformation comprises a byte-wise cyclic redundancy code (CRC).

11. A method comprising:
    receiving, by a key validator, a transmitted key of a predetermined number of bytes, the transmitted key comprising an actual key in a first portion of the predetermined number of bytes, a usage count, and a check field in a second portion of the predetermined number of bytes;
    receiving, by the key validator, an identifier corresponding to a client device, the identifier comprising a system-on-chip identifier corresponding to the client device from a non-volatile memory within the client device;
    performing, by the key validator, a reverse transformation on the transmitted key using the identifier, wherein performing the reverse transformation comprises;
        verifying the check field of the received transmitted key using the identifier to produce the actual key,
        clearing, upon verifying the check field, the second portion of the predetermined number of bytes from in the transmitted key, and
        initiating, in the cleared second portion, a key usage counter for the usage count;
    receiving, by a descrambler, the actual key from the key validator; and
    decrypting, by the descrambler, content with the actual key, wherein decrypting the content comprises;

setting the key usage counter with the usage count produced by the reverse transformation, decrementing the key usage counter each time a packet of the content is decrypted, and stopping the content decryption when the key usage counter is zero.

12. The method of claim 11, wherein performing the reverse transformation comprises performing the reverse transformation wherein the reverse transformation also produces the usage count indicating a number of packets on which the actual key may be used to decrypt.

13. The method of claim 11, wherein performing the reverse transformation comprises performing the reverse transformation comprising a byte-wise XOR.

14. The method of claim 11, wherein performing the reverse transformation comprises performing the reverse transformation comprising a byte-wise XOR, the transmitted key including a check field value such that when the byte-wise XOR is performed on the transmitted key and identifier, zero is produced.

15. The method of claim 11, wherein performing the reverse transformation comprises performing the reverse transformation comprising a byte-wise cyclic redundancy code (CRC).

* * * * *